Oct. 11, 1938.　　　　E. A. NELLIS　　　　2,133,208
LAWN TOOL
Filed April 20, 1937
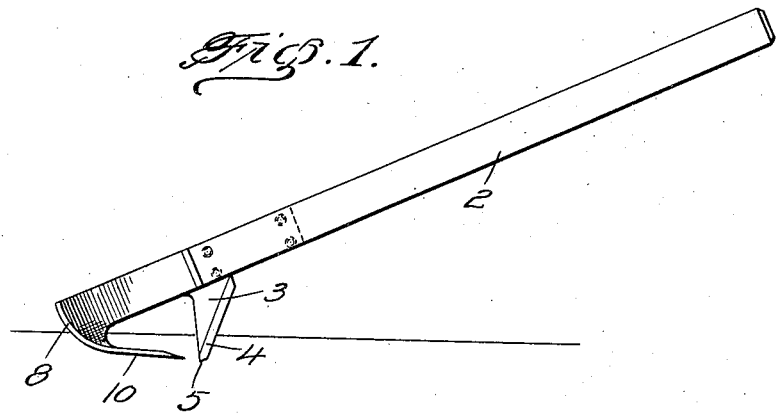
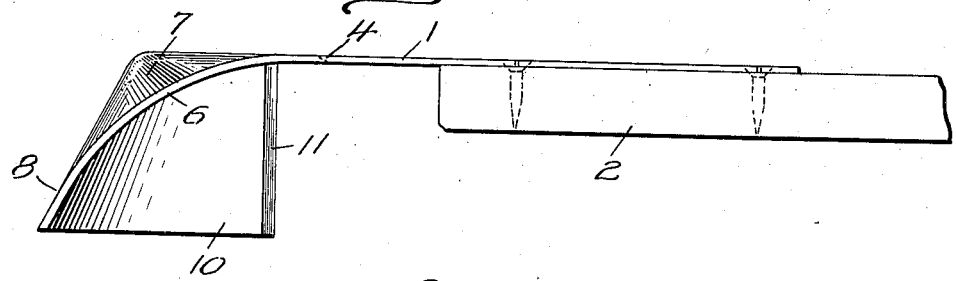
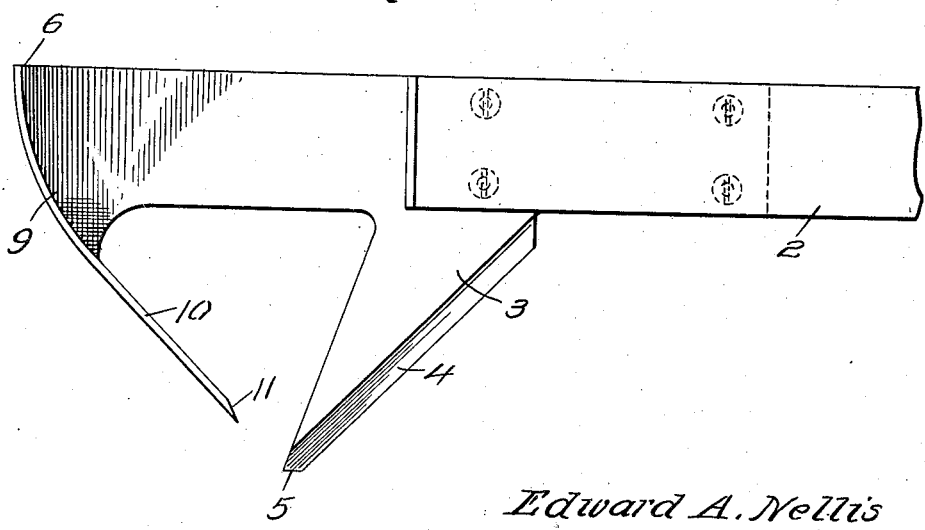
Edward A. Nellis
INVENTOR
BY Victor J. Evans & Co.
ATTORNEYS Patented Oct. 11, 1938

2,133,208

UNITED STATES PATENT OFFICE 2,133,208

LAWN TOOL

Edward A. Nellis, Dayton, Ohio

Application April 20, 1937, Serial No. 138,010

2 Claims. (Cl. 97—227)

This invention relates to lawn tools, commonly known as trimmers or edgers, and its general object is to provide a tool of that character which is capable of use in cutting or trimming the edges of lawns, along or about walks, beds, shrubbery, trees, etc., and simultaneously removing and depositing the material cut laterally of the edge, leaving the latter clean and free from the cut material, as well as even and uniform throughout its length, and such can be accomplished in an easy and expeditious manner, with minimum effort on the part of the user, due to the novel structure and arrangement of the parts of the tool.

A further object is to provide a lawn trimmer that can be used with extreme accuracy, at any depth desired, along and about all edges to be trimmed, whether they are straight or curved, or below or above walks, steps, etc.

Another object is to provide a lawn trimmer, that requires minimum pressure during the use thereof, cannot become clogged, and includes cutting edges which can be readily sharpened.

A still further object is to provide a lawn trimmer, that is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation of the lawn trimmer which forms the subject matter of the present invention, and illustrates the position thereof when in use.

Figure 2 is a fragmentary enlarged plan view thereof.

Figure 3 is an enlarged fragmentary side elevation.

Referring to the drawing in detail, it will be noted that the shank of the head of my tool, and which is indicated by the reference numeral 1 is relatively flat and elongated, as best shown in Figure 2, and is secured to the handle 2 on one side thereof by suitable securing means such as screws. The shank extends a considerable distance beyond the outer end of the handle, and formed on the shank preferably at its connection with the handle, is a substantially triangular shaped blade 3 that extends at a rearward inclination from the lower edge of the shank, as best shown in Figure 3. The forward edge of the blade 3 is beveled as at 4 to provide a cutting edge that extends from the connection of the blade with the shank to the apex thereof, and the apex portion not only terminates into a penetrating point, but is beveled to provide a cutting edge 5 at an angle to the beveled edge 4, to facilitate the insertion of the blade 3 within the sod of the lawn, as will be apparent.

The shank extends rearwardly beyond the connection of the blade 3 therewith and merges at its extreme outer end in the laterally curved upper portion 6 of the body of what may be termed the scooping blade of my tool, and it will be noted from Figure 2, that the upper portion from its curved upper edge is curved rearwardly and downwardly as at 7, and the body from the portion 7 extends laterally at a rearward inclination as at 8. The portion 8 is curved forwardly as at 9 and merges into the blade portion 10 which is directed at a downward and forward inclination toward the blade 3, but is spaced therefrom as shown in Figure 3, and disposed laterally thereof as shown in Figure 2. The blade portion 10 preferably terminates above the apex portion of the blade 3, and into a beveled lower edge 11.

From the above description and disclosure of the drawing, it will be obvious that I have provided a tool for trimming the edges of lawns, and from Figure 1, it will be apparent that the tool is to be pulled, which will result in the blade 3 cutting the sod vertically and the blade portion 10 cutting the sod horizontally and outwardly laterally of the blade 3, and the material cut will be directed upwardly along the blade portion 10, and thence laterally along the rearward inclined portion 8 for disposal in a row, to facilitate the removal thereof, as will be apparent. Due to the inclined beveled edge 4 and the cutting edge 5, together with the arrangement of the blade portion 10, it will be further obvious that very little pressure will be required in retaining the blades within the sod, and the resistance offered by the blades is likewise slight, consequently the tool can be used for a prolonged period of time without fatigue, and the arrangement of the blades and body makes it almost impossible for the tool to become clogged, with the result the edges of lawns can be cut even and uniform throughout their length, regardless of whether they be straight or curved, or their arrangement with respect to walks, steps and the like. It will be further obvious that the tool can be used at any depth desired within the length of the blade 3.

It might be further mentioned, that the tool can be made either right or left handed. A left hand tool is shown in the drawing and a right hand tool is similar thereto, in structure, but the scooping blade will extend laterally from the opposite side of the shank, from that disclosed in the drawing.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A lawn trimmer comprising a handle, a head including an elongated shank secured to the handle, a substantially triangular shaped blade depending from the shank at its juncture with the handle and having a beveled forward cutting edge directed at a rearward inclination, said triangular shaped blade having a beveled lower apex portion providing a cutting edge disposed at an angle to the forward cutting edge thereof, a laterally directed body formed on the outer end of the shank and directed rearwardly at an inclination, a blade extending at a forward inclination from the body for disposal laterally of and at right angles with respect to the first blade and the second blade having a beveled lower cutting edge terminating in spaced relation with respect to the lower edge of the first blade and in a plane above the same.

2. A lawn trimmer comprising a handle, a head including an elongated shank secured to the handle, a substantially triangular shaped blade depending at a rearward inclination from the shank at its juncture with the handle and having a front rearwardly inclined beveled cutting edge, a laterally directed body formed on the outer end of the shank and curved rearwardly and downwardly adjacent its juncture with the shank thence curved laterally at a rearward inclination, a blade depending from the body at a forward inclination and spaced from and extending toward the first blade laterally thereof and at right angles thereto and the second blade terminating at its lower end in a beveled cutting edge spaced from and in a plane above the lower edge of the first blade.

EDWARD A. NELLIS.